(12) United States Patent
Kasuya et al.

(10) Patent No.: US 9,643,608 B2
(45) Date of Patent: May 9, 2017

(54) VEHICULAR POWER TRANSMISSION DEVICE

(71) Applicant: AISIN AW CO., LTD., Anjo-shi, Aichi-ken (JP)

(72) Inventors: Satoru Kasuya, Nishio (JP); Masashi Kito, Anjo (JP); Yuichi Seki, Okazaki (JP); Makoto Iwanaka, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 49 days.

(21) Appl. No.: 14/652,683

(22) PCT Filed: Jan. 27, 2014

(86) PCT No.: PCT/JP2014/051677
§ 371 (c)(1),
(2) Date: Jun. 16, 2015

(87) PCT Pub. No.: WO2014/119515
PCT Pub. Date: Aug. 7, 2014

(65) Prior Publication Data
US 2015/0337953 A1   Nov. 26, 2015

(30) Foreign Application Priority Data

Jan. 29, 2013   (JP) .................................. 2013-014031

(51) Int. Cl.
*B60W 30/18*   (2012.01)
*B60W 10/06*   (2006.01)
(Continued)

(52) U.S. Cl.
CPC ......... *B60W 30/18027* (2013.01); *B60K 6/48* (2013.01); *B60T 1/06* (2013.01);
(Continued)

(58) Field of Classification Search
CPC ............... B60W 10/06; B60W 10/182; B60W 30/18027; B60W 30/18118;
(Continued)

(56) References Cited

U.S. PATENT DOCUMENTS 6,527,670 B1   3/2003  Gierer et al.
8,764,608 B2 *  7/2014  Lim ..................... B60W 10/06
                                          477/194

(Continued)

FOREIGN PATENT DOCUMENTS

JP   H06-83526 U   11/1994
JP   2002-533631 A  10/2002
(Continued)

OTHER PUBLICATIONS

Mar. 25, 2014 International Search Report issued in Application No. PCT/JP2014/051677.

*Primary Examiner* — Ramya Burgess
*Assistant Examiner* — David Morris
(74) *Attorney, Agent, or Firm* — Oliff PLC

(57) ABSTRACT

A vehicular power transmission device that includes a parking gear that is drivingly coupled with wheels; a parking pawl that is capable of meshing or unmeshing with or from the parking gear; a hydraulic pressure actuator that unmeshes the parking pawl from the parking gear when a release hydraulic pressure is supplied; a first oil pump that generates a hydraulic pressure; a second oil pump that generates a hydraulic pressure, the second oil pump having a capacity smaller than the first oil pump; a hydraulic pressure control device that is capable of deriving the release hydraulic pressure from the hydraulic pressure generated by the second oil pump or the hydraulic pressure generated by (Continued)

the first oil pump and supplying the release hydraulic pressure to the hydraulic pressure actuator; and a control unit.

9 Claims, 6 Drawing Sheets

(51) Int. Cl.
*B60W 10/18* (2012.01)
*F16H 61/30* (2006.01)
*F16H 63/34* (2006.01)
*B60T 1/06* (2006.01)
*B60K 6/48* (2007.10)
*B60W 10/30* (2006.01)
*B60W 20/00* (2016.01)
*F16H 59/54* (2006.01)
*F16H 59/66* (2006.01)
*F16H 61/22* (2006.01)
*F16H 61/28* (2006.01)
*F02D 29/02* (2006.01)
*F16H 63/50* (2006.01)

(52) U.S. Cl.
CPC ............ *B60T 1/062* (2013.01); *B60W 10/30* (2013.01); *B60W 20/00* (2013.01); *F02D 29/02* (2013.01); *F16H 59/54* (2013.01); *F16H 59/66* (2013.01); *F16H 61/22* (2013.01); *F16H 61/28* (2013.01); *F16H 61/30* (2013.01); *F16H 63/34* (2013.01); *F16H 63/3425* (2013.01); *F16H 63/50* (2013.01); *B60W 10/06* (2013.01); *B60W 10/182* (2013.01); *B60W 30/18118* (2013.01); *B60W 2540/16* (2013.01); *B60W 2550/142* (2013.01); *B60W 2710/18* (2013.01); *B60W 2710/186* (2013.01); *B60W 2710/188* (2013.01); *Y02T 10/6221* (2013.01)

(58) Field of Classification Search
CPC ....... B60W 2540/16; B60W 2550/142; B60W 2710/18; B60W 2710/186; B60W 2710/188

See application file for complete search history.

(56) References Cited

U.S. PATENT DOCUMENTS

| 2003/0019702 A1* | 1/2003 | Goedecke | ............... B60T 1/005 188/353 |
| 2003/0047413 A1* | 3/2003 | Gierer | .................... B60T 1/005 192/219 |
| 2004/0029677 A1 | 2/2004 | Mori et al. | |
| 2015/0316143 A1* | 11/2015 | Deurloo | .............. F16H 63/3483 192/219.4 |

FOREIGN PATENT DOCUMENTS

| JP | 2004-068732 A | 3/2004 |
| JP | 2009-115186 A | 5/2009 |
| JP | 2010-112444 A | 5/2010 |
| JP | 2010-223329 A | 10/2010 |

* cited by examiner

VEHICULAR POWER TRANSMISSION DEVICE

BACKGROUND

The present disclosure relates to a vehicular power transmission device installed in a vehicle, particularly a vehicular power transmission device capable of, using a hydraulic pressure actuator, meshing or unmeshing a parking pawl with or from a parking gear that is drivingly coupled with wheels.

In recent years, for vehicular power transmission devices such as automatic transmissions installed, for example, in vehicles, etc., hybrid drive devices installed in hybrid vehicles, electrically powered drive devices installed in electric vehicles, etc., there have been developed so-called shift-by-wire systems that switch a shift range at the vehicular power transmission devices by converting a selection operation on a shift lever into an electrical signal.

In some shift-by-wire systems as mentioned above, a parking pawl that meshes or unmeshes with respect to a parking gear is driven by a hydraulic pressure when switching between a parking range and a non-parking range (a reverse range, a neutral range, a drive range, etc.) (refer to Japanese Patent Application Publication No. 2010-112444)

The aforementioned Japanese Patent Application Publication No. 2010-112444 discloses a parking mechanism in which the parking pawl (parking lock pawl) is urged by a spring that presses a parking rod in a direction to mesh with the parking gear, and when unmeshing the parking pawl from the parking gear, a hydraulic pressure is supplied to a hydraulic pressure actuator to drive the parking rod, thereby a non-parking state is established.

SUMMARY

Disclosure

For example, vehicles having an idle stop function, hybrid vehicles, electric vehicles, etc. are mainly provided with mechanical oil pumps that are driven in conjunction with driving sources of the vehicles such as internal combustion engines, drive motors, etc. and electrically powered oil pumps that are driven by electric power independently from the mechanical oil pumps.

In a shift-by-wire system as mentioned above, if the parking pawl is unmeshed from the parking gear by the hydraulic pressure from the mechanical oil pump at all times, the driving source keeps driven in a parking state, which disturbs improvement of fuel efficiency (electricity efficiency).

On the other hand, in a case in which the parking pawl is unmeshed when the parking gear and the parking pawl are engaged, for example, in a state in which the vehicle is inclined in a hill, etc., the vehicle weight acts on the parking pawl via the parking gear, which causes a problem that sliding resistance between the parking pawl and the parking rod becomes large.

To unmesh between the parking gear and the parking pawl in the shift-by-wire system as mentioned above, it becomes necessary to supply a high hydraulic pressure to the hydraulic pressure actuator as mentioned above. Therefore, to unmesh the parking pawl from the parking gear by the hydraulic pressure from the electrically powered pump, it is necessary to provide an electrically powered oil pump that is capable of outputting such a high hydraulic pressure. Thereby, the electrically powered oil pump is enlarged, and cost-down and down-sizing are disturbed.

The present disclosure provides a vehicular power transmission device that is capable of improving fuel efficiency (electricity efficiency) while preventing an electrically powered oil pump from being large.

A vehicular power transmission device according to an exemplary aspect includes a parking gear that is drivingly coupled with wheels; a parking pawl that is capable of meshing or unmeshing with or from the parking gear; a hydraulic pressure actuator that unmeshes the parking pawl from the parking gear when a release hydraulic pressure is supplied; a first oil pump that generates a hydraulic pressure; a second oil pump that generates a hydraulic pressure, the second oil pump having a capacity smaller than the first oil pump; a hydraulic pressure control device that is capable of deriving the release hydraulic pressure from the hydraulic pressure generated by the second oil pump or the hydraulic pressure generated by the first oil pump and supplying the release hydraulic pressure to the hydraulic pressure actuator, and a control unit that, when a non-parking range is selected from a parking range through an operation on a shift selection part while the first oil pump is stopped, when the control unit determines that an inclination of a vehicle is less than a predetermined inclination angle, controls the hydraulic pressure control device such that the release hydraulic pressure derived from the hydraulic pressure generated by the second oil pump is supplied to the hydraulic pressure actuator, and when the control unit determines that the inclination of the vehicle is greater than the predetermined inclination angle, causes the first oil pump to be driven and controls the hydraulic pressure control device such that the release hydraulic pressure derived from the hydraulic pressure generated by the first oil pump is supplied to the hydraulic pressure actuator.

Thereby, in a case in which the inclination of the vehicle is less than the predetermined inclination angle, it is possible to unmesh the parking pawl from the parking gear by a hydraulic pressure of the second oil pump having a small capacity, make an energy loss smaller, and help the improvement of the fuel efficiency (electricity efficiency) of the vehicle. In addition, in a case in which the inclination of the vehicle is greater than the predetermined inclination angle, the sliding resistance to unmesh the parking pawl from the parking gear is large. Therefore, a high release hydraulic pressure is required. However, by causing the first oil pump to be driven, it is possible to unmesh the parking pawl from the parking gear by a high hydraulic pressure generated by the first oil pump. Therefore, it is possible to prevent the second oil pump from being enlarged, and help the cost-down and down-sizing.

A vehicular power transmission device according to an exemplary aspect, wherein the first oil pump is a mechanical oil pump that is driven by a driving source driving the vehicle and generates a hydraulic pressure, the second oil pump is an electrically powered oil pump that is driven by a rotary electric device that is different from the driving source and generates a hydraulic pressure, the control unit, when a non-parking range is selected from the parking range through an operation on the shift selection part while the driving source is stopped, when the control unit determines that the inclination of the vehicle is less than the predetermined inclination angle, controls the hydraulic pressure control device such that the release hydraulic pressure derived from the hydraulic pressure generated by the electrically powered oil pump is supplied to the hydraulic pressure actuator, and when the control unit determines that the inclination of the vehicle is greater than the predetermined inclination angle, causes the driving source to be driven to cause the mechanical oil pump to be driven and controls the hydraulic pressure control device such that the release hydraulic pressure derived from the hydraulic pressure generated by the mechanical oil pump is supplied to the hydraulic pressure actuator.

Thereby, in a case in which the inclination of the vehicle is less than the predetermined inclination angle, it is possible to unmesh the parking pawl from the parking gear by a hydraulic pressure of the electrically powered oil pump while keeping the driving source stopped, make the driving of the driving source unnecessary, and help the improvement of the fuel efficiency (electricity efficiency) of the vehicle. In addition, in a case in which the inclination of the vehicle is greater than the predetermined inclination angle, the sliding resistance to unmesh the parking pawl from the parking gear is large. Therefore, a high release hydraulic pressure is required. However, by causing the driving source to be driven to cause the mechanical oil pump to be driven, it is possible to unmesh the parking pawl from the parking gear by a high hydraulic pressure generated by the mechanical oil pump. Therefore, it is possible to prevent the electrically powered oil pump from being enlarged, and help the cost-down and down-sizing.

A vehicular power transmission device according to an exemplary aspect, further includes a detector that is capable of detecting unmeshing between the parking pawl and the parking gear, wherein when the control unit determines that the inclination of the vehicle is greater than the predetermined inclination angle and causes the driving source to be driven to cause the mechanical oil pump to be driven, when the unmeshing between the parking pawl and the parking gear is detected, the control unit causes the driving source to be stopped.

Thereby, in a case in which the control unit determines that the inclination of the vehicle is greater than the predetermined angle and causes the driving source to be driven to cause the mechanical oil pump to be driven, when the unmeshing between the parking pawl and the parking gear is detected, the driving source is caused to be stopped. Therefore, it is possible to reliably unmesh the parking pawl from the parking gear, eliminate unnecessary driving of the driving source, and help the improvement of the fuel efficiency (electricity efficiency) of the vehicle.

A vehicular power transmission device according to an exemplary aspect, further includes a friction engagement element that is provided on a power transmission path from the driving source to wheels and capable of disconnecting power transmission between the driving source and the wheels, wherein when a non-parking range is selected from the parking range through an operation on the shift selection part while the driving source is stopped, in a case in which the control unit determines that the inclination of the vehicle is greater than the predetermined inclination angle, the control unit, with the power transmission path being disconnected by the friction engagement element, causes the driving source to be driven to cause the mechanical oil pump to be driven and controls such that the release hydraulic pressure derived from the hydraulic pressure generated by the mechanical oil pump is supplied to the hydraulic pressure actuator.

Thereby, when a non-parking range is selected from the parking range through an operation on the shift selection part while the driving source is stopped, in a case in which the control unit determines that the inclination of the vehicle is greater than the predetermined inclination angle, the control unit, with the power transmission path being disconnected by the friction engagement element, causes the driving source to be driven to cause the mechanical oil pump to be driven and controls such that the release hydraulic pressure derived from the hydraulic pressure generated by the mechanical oil pump is supplied to the hydraulic pressure actuator. Thus, it is possible to prevent a driving force from being transmitted to the wheels because the power transmission path is disconnected by the friction, even when the driving source is caused to be driven engagement element. That is, it is possible to unmesh the parking pawl from the parking gear by a high hydraulic pressure by the mechanical oil pump without causing the vehicle to be driven.

A vehicular power transmission device according to an exemplary aspect, wherein the friction engagement element is a friction engagement element that establishes a transmission path in a speed change mechanism, and when a travel range among non-parking ranges is selected from the parking range through an operation on the shift selection part, the control unit causes the driving source to be stopped and thereafter causes the friction engagement element to be engaged.

Thereby, when a travel range among non-parking ranges is selected from the parking range through an operation on the shift selection part, the control unit causes the driving source to be stopped, and thereafter causes the friction engagement element of the speed change mechanism to be engaged. Thus, it is possible to realize a starting of the vehicle by the driving source after the speed change mechanism is brought into a state of the travel range.

A vehicular power transmission device according to an exemplary aspect, wherein in a case in which the control unit determines that the inclination of the vehicle is greater than the predetermined inclination angle, the control unit causes the driving source to be driven to cause the mechanical oil pump to be driven and causes the electrically powered oil pump to be driven.

Thereby, when a non-parking rage is selected from the parking range through an operation on the shift selection part while the driving source is stopped, in a case in which the control unit determines that the inclination of the vehicle is greater than the predetermined inclination angle, the control unit causes the mechanical oil pump to be driven and unmeshes the parking pawl from the parking gear by a high hydraulic pressure by the mechanical oil pump. By keeping the electrically powered oil pump driven in the meanwhile, it becomes possible to perform, in a short time, transition to a hydraulic pressure supply state by the electrically powered oil pump after stopping the mechanical oil pump by stopping the driving source. Thus, it is possible to stop the driving source earlier, thereby it is possible to help the improvement of the fuel efficiency.

A vehicular power transmission device according to an exemplary aspect, wherein the hydraulic pressure control device controls by a hydraulic pressure a friction engagement element that establishes a transmission path in the speed change mechanism, and the electrically powered oil pump supplies a hydraulic pressure to the hydraulic control device while the driving source is stopped.

Thereby, the electrically powered oil pump is the oil pump that supplies a hydraulic pressure to the hydraulic pressure control device while the driving source is stopped. Thus, it is possible to make it unnecessary to provide an oil pump dedicated to generate a hydraulic pressure to unmesh the parking pawl from the parking gear.

A vehicular power transmission device according to an exemplary aspect, wherein the control unit determines whether the inclination of the vehicle is less than or greater than the predetermined inclination angle.

DETAILED DESCRIPTION OF THE EMBODIMENTS

First Embodiment

A first embodiment according to the present disclosure will be described below with reference to FIG. 1 to FIG. 3. First, a schematic structure of a hybrid vehicle 100 to which the present disclosure can apply will be described with reference to FIG. 1.

Figure 1:
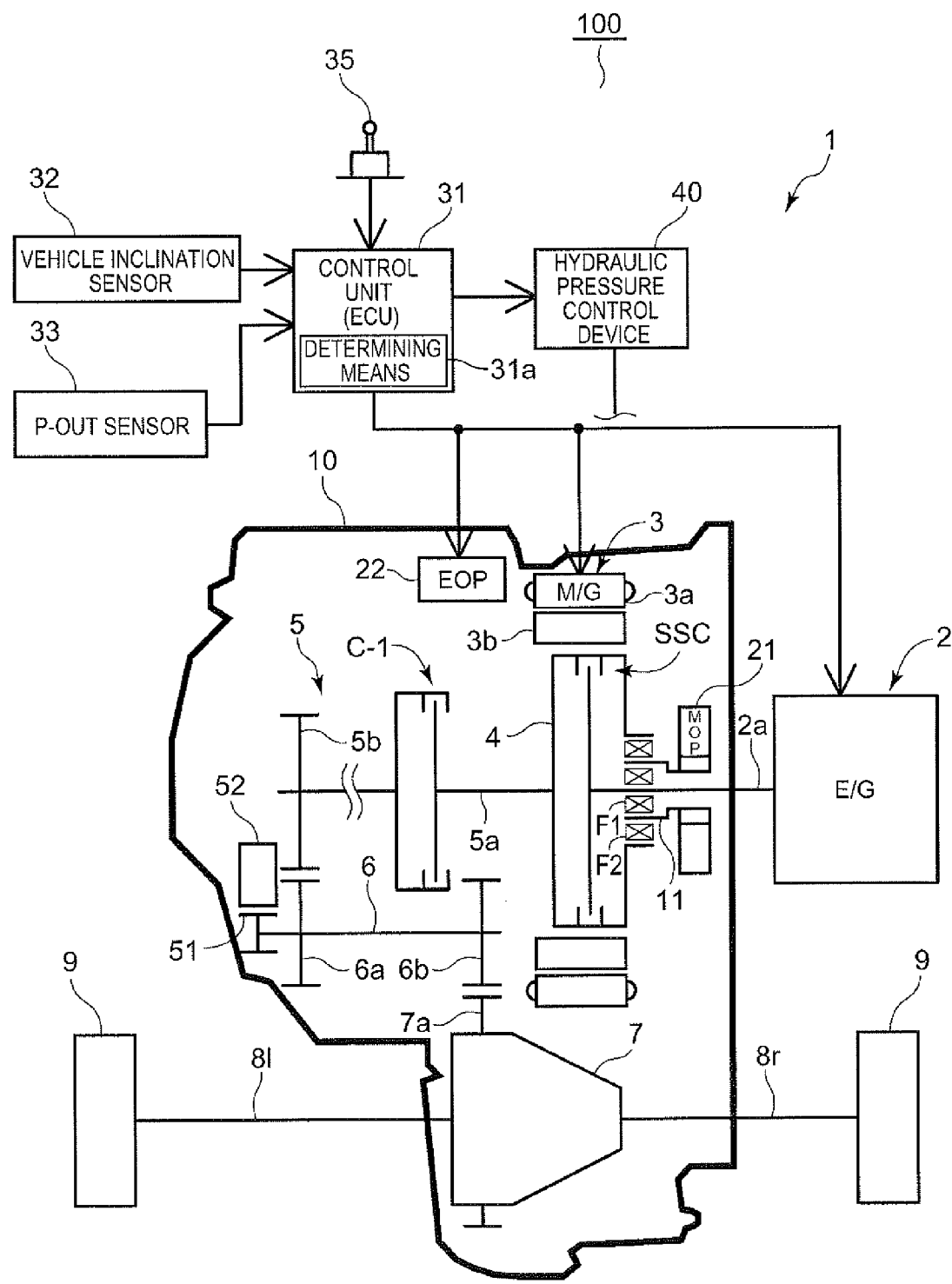
FIG. 1 is a schematic view that shows a vehicle according to a first embodiment.

As shown in FIG. 1, the hybrid vehicle (hereinafter, simply referred to as "vehicle") 100 is for example a FF (front-engine, front-wheel drive) type vehicle, and includes, as driving sources, a rotary electric machine (motor-generator) 3 besides an internal combustion engine 2. A hybrid drive device (vehicular power transmission device) 1 forming a power train of the vehicle 100 includes, in an inside of a case 10, the aforementioned motor-generator (hereinafter, simply referred to as "motor") 3 having a stator 3a and a rotor 3b, a speed change mechanism 5 that is provided on a power transmission path between the internal combustion engine 2 and wheels 9 and includes a clutch C-1 (friction engagement element) engageable and disengageable such that the power transmission path can be connected and disconnected, and an engine connection clutch SSC that is placed between the speed change mechanism 5 and the internal combustion engine 2 and connects and disconnects power transmission between an output shaft (crank shaft) 2a of the internal combustion engine 2 and an input shaft 5a of the speed change mechanism 5. The engine connection clutch SSC is configured to include a clutch drum 4 drivingly coupled with the input shaft 5a to serve as an output-side rotation member and drivingly coupled with the rotor 3b to serve as a rotation output member of the motor 3. Note that a damper device, etc. that absorbs pulsing motion of the internal combustion engine 2 and transmits the rotation is generally provided between the internal combustion engine 2 and the engine connection clutch SSC although not shown in figures.

The speed change mechanism 5 includes a speed change mechanism that is capable of changing the transmission path on the basis of engagement states of a plurality of friction engagement elements (clutch and brake) including the aforementioned clutch C-1 and achieving, for example, 6 forward shift speeds and a reverse shift speed. In addition, a counter gear 5b serving as an output member of the speed change mechanism 5 is meshed with a counter input gear 6a of a counter shaft 6, and a counter output gear 6b of the counter shaft 6 is meshed with an input gear 7a of a differential device 7. Consequently, output rotation of the speed change mechanism 5 is output to right and left wheels 9 and 9 via the differential device 7 and right and left drive shafts 8r and 8l. The wheels 9 and 9 are drivingly coupled with the counter shaft 6 via the aforementioned right and left drive shafts 8r and 8l and the differential device 7. One end of the counter shaft 6 is fixed to a parking gear 51 that is described in detail later. That is, the parking gear 51 is drivingly coupled with the wheels 9 and 9.

The speed change mechanism 5 may be, a stepped speed change mechanism that establishes, for example, 3 to 5 forward shift speeds, or 7 or more forward shift speeds. Alternately, the speed change mechanism may be a continuously variable transmission such as a belt type continuously variable transmission, a troidal type continuously variable transmission, a ring cone type continuously variable transmission, etc. The present disclosure may be applied to any speed change mechanisms as long as a friction engagement element capable of connecting and disconnecting the power transmission path is included.

In addition, the hybrid drive device 1 is provided with, outside a case 10, a control unit 31 and a hydraulic pressure control device 40 that is capable of controlling the speed change mechanism 5 and the engine connection clutch SSC by a hydraulic pressure. The control unit 31 is electrically connected to a vehicle inclination sensor 32 that is provided in the vehicle 100 and detects an inclination of the vehicle and a P-out sensor (detector) 33 that is capable of detecting that a parking gear and a parking pawl have been unmeshed by detecting a rotation angle position of a manual shaft, which is described in detail later, that is, a parking state has been released (hereinafter, referred to as "P-out"). In addition, the control unit 31 includes a determiner 31a that determines on the basis of the detection result of the vehicle inclination sensor 32 whether the inclination of the vehicle 100 is greater or less than a predetermined inclination angle (the inclination angle is equal to or greater than the predetermined angle or the inclination angle is less than the predetermined angle).

In addition, the control unit 31 is electrically connected to respective shift position sensors of a shift lever (shift selection section) 35 that is for example placed at a driver seat (not shown) and capable of selecting by operation a parking range (P-range), a reverse range (R-range) (non-parking range, travel range), a neutral range (N range) (non-parking range), a drive range (D-range) (non-parking range, travel range).

In the present embodiment, it is described as an example that the inclination of the vehicle is detected by the vehicle inclination sensor 32. However, for example, a travel resistance may be calculated based on an output torque of a driving source, a braking force, and a vehicle acceleration, the inclination for example immediately before the vehicle stops may be calculated from the travel resistance, and the inclination angle of the vehicle that is stopped may be calculated. However, the present disclosure is not limited thereto. Information of a car navigation device, etc. may be utilized. That is, any method or device may be utilized as long as the inclination of the vehicle can be detected.

In addition, it is described as an example that it is detected by the P-out sensor 33 that detects the rotation angle position of the manual shaft that the parking gear and the parking pawl have been unmeshed. However, the present disclosure is not limited thereto. For example, it may be detected based on an angle of a parking pawl 52, an axial direction position of a parking rod 55, an axial direction position of a piston rod 58 and a piston 47, etc., which are described in detail later, that the parking gear and the parking pawl have been unmeshed. That is, any detector (detecting sensor) may be utilized as long as it is capable of detecting unmeshing between the parking gear and the parking pawl.

The hybrid drive device 1 as described above includes the engine connection clutch SSC and the motor 3, the speed change mechanism 5, the counter shaft 6, the differential device 7, the right and left drive shafts 8r and 8l, etc., which are sequentially placed from the internal combustion engine 2 side toward the wheels 9 side. When causing the vehicle to travel by driving both the internal combustion engine 2 and the motor 3, the control unit (ECU) 31 controls the hydraulic pressure control device 40 to bring the speed change mechanism 5 into the state of the travel rage (D-range, R-range) and causes the engine connection clutch SSC to be engaged. At a time of EV travel in which the vehicle travels only by the driving force of the motor 3, the engine connection clutch SSC is caused to be released while maintaining the speed change mechanism 5 to be in the state of the travel range to disconnect the transmission path between the internal combustion engine 2, the speed change mechanism 5, and the motor 3.

In addition, the hybrid drive device 1 is provided with a mechanical oil pump (first oil pump) 21 and an electrically powered oil pump (second oil pump) 22 to generate hydraulic pressures (source pressure) that are utilized at the hydraulic pressure control device 40. The mechanical oil pump 21 is drivingly coupled such that the drive gear is interlocked with an interlocking shaft 11. A first one-way clutch F1 is included between the interlocking shaft 11 and the output shaft 2a of the internal combustion engine 2, which runs idle when a rotational speed of the internal combustion engine 2 is equal to or less than a rotational speed of the interlocking shaft 11. A second one-way clutch F2 is included between the interlocking shaft 11 and the clutch drum 4 (i.e., the rotor 3b of the motor 3), which runs idle when a rotational speed of the motor 3 is equal to or less than a rotational speed of the interlocking shaft 11. That is, when the internal combustion engine 2 and the motor 3 rotate, the mechanical oil pump 21 is rotatably driven in conjunction with the one with a higher rotational speed. On the other hand, the electrically powered oil pump 22 is configured to have a capacity smaller than the mechanical oil pump 21, and to be capable of being electrically driven by an electric motor (not shown) independently from the mechanical oil pump 21, and to be controlled to be driven and stopped based on an electronic command from the control unit 31. The electrically powered oil pump 22 originally supplies a hydraulic pressure to the hydraulic pressure control device 40 for example during an idle-stop state while the vehicle 100 is stopped, and generates a hydraulic pressure to establish a transmission path by engaging friction engagement elements at the speed change mechanism 5 and a hydraulic pressure to lubricate the speed change mechanism 5, the motor 3, etc.

In addition, the hydraulic pressure control device 40 and a parking mechanism 50 according to the present embodiment are explained with reference to FIG. 2. Initially, the configuration of the parking mechanism 50 is explained.

Figure 2:
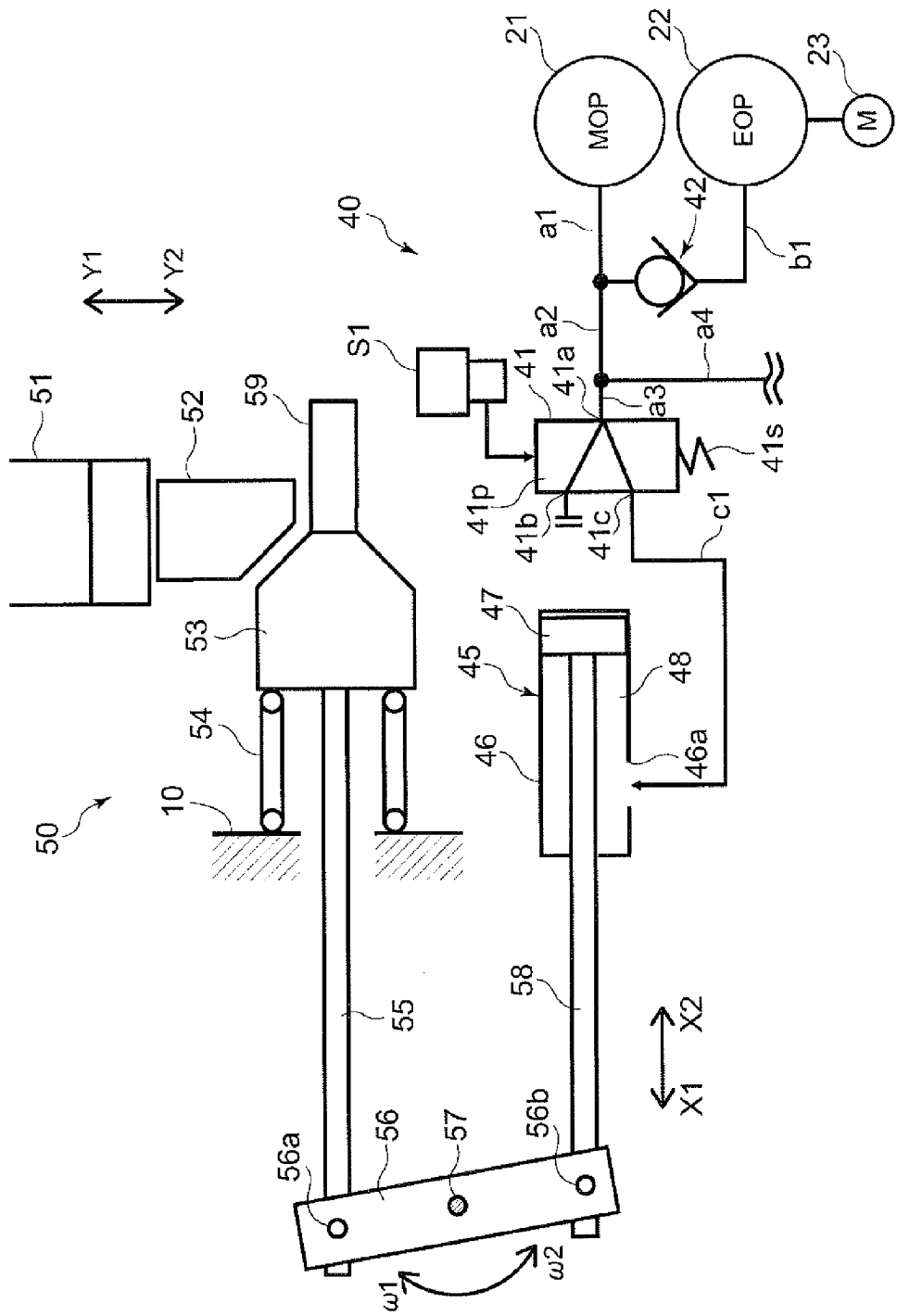
FIG. 2 is a schematic view that shows a hydraulic pressure control device and a parking mechanism according to the first embodiment.

As shown in FIG. 2, the parking mechanism 50 is configured to be provided with: the parking gear 51; the parking pawl 52; the parking rod 55 including a retaining member 59, a cam 53, and a coil spring 54; a rotating lever 56; a piston rod 58; the hydraulic pressure actuator 45, etc. The parking gear 51 is unrotatably provided with respect to the counter shaft 6 of the speed change mechanism 5, as mentioned above, and is formed with a plurality of gears placed on an outer border in a circumferential direction at regular intervals.

The parking pawl 52 is placed in a manner slidable in a Y1-Y2 direction (in the figure) centering at a supporting point (not shown), and provided in an extended condition with a tooth meshable with a gear concavity of the parking gear 51 on the side facing the parking gear 51. In addition, the parking pawl 52 is normally urged by a spring (not shown) in a direction (Y2 direction) opposite to the parking gear 51 such that the parking pawl 52 is detached from the parking gear 51 for example while traveling in a non-parking state.

The parking rod 55 is rotatably attached at one end of the parking rod 55 to a first engagement section 56a of the rotating lever 56, extends toward the other end in a linear fashion, and provided at the other end with the cam 53 slidable in an axial direction (X1-Z2 direction). In addition, at the edge of the other end of the parking rod 55, the retaining member 59 that retains the cam 53 is fixed to the parking rod 55.

The coil spring 54 is provided in a compressed manner between the cam 53 and the case 10. The coil spring 54 normally urges the parking rod 55 in a direction X2 of an arrow through the cam 53 and the retaining member 59, that is, normally urges the parking rod 55 together with the cam 53 and the retaining member 59 in a direction in which the cam 53 presses the parking pawl 52 toward the parking gear 51 to mesh with each other.

On the other hand, the rotating lever 56 is rotatably supported in a $\omega 1$-$\omega 2$ direction, for example, centering at the manual shaft 57 that is rotatably supported to the case 10, rotatably attached at the first engagement section 56a that is on one direction side from the manual shaft 57 to one end of the parking rod 55 so as to be drivingly coupled, and rotatably attached at a second engagement section 56b that is on the other direction side from the manual shaft 57 to one end of the piston rod 58 so as to be drivingly coupled.

The axial direction position of the parking rod 55 is interlocked with a rotation angle of the rotating lever 56 and the rotating lever 56 is fixed to the manual shaft 57. Therefore, it is possible to detect the axial direction position of the parking rod 55 by detecting the rotation angle of the manual shaft 57. Consequently, it is possible to detect, based on the rotation angle of the manual shaft 57, whether the axial direction position of the parking rod 55 is a position at which the parking pawl 52 is meshed with the parking gear 51 by the cam 53 or the parking pawl 52 is unmeshed from the parking gear 51 by the cam 53. Thus, a rotation angle sensor is attached to the manual shaft 57, which serves as the aforementioned P-out sensor 33 that detects whether the parking state or the non-parking state (P-out) is established.

On the other hand, the hydraulic pressure actuator 45 is configured to include a cylinder 46, the piston 47 movable in a X1-X2 direction that is an axial direction inside the cylinder 46, and a hydraulic oil chamber 48 formed between the cylinder 46 and the piston 47. An input port 46a connected to the aforementioned oil passage c1 is formed on the cylinder 46. The aforementioned piston rod 58 is fixed to the piston 47. That is, the piston 47 is configured so as to interlock with the piston rod 58, the rotating lever 56, the parking rod 55, etc.

In addition, a configuration of the hydraulic pressure control device 40 is explained. The electrically powered oil pump 22 that is controlled to be driven and stopped by a motor (rotary electric machine) 23 that is different from the aforementioned internal combustion engine 2 and the motor 3 generates a hydraulic pressure $P_{EOP}$ corresponding to the specifications (design) of the electrically powered oil pump 22 in the oil passage b1. In a case in which the mechanical oil pump 21 is stopped or in a low-speed rotating state (that is, the internal combustion engine 2 and the motor 3 are stopped or in a low-speed rotating state) and the hydraulic pressure $P_{EOP}$ of the electrically powered oil pump 22 is greater than the hydraulic pressure $P_{MOP}$ of the mechanical oil pump 21, a check ball 42 opens, and the hydraulic pressure $P_{EOP}$ is supplied to oil passages a1, a2, a3, and a4 and adjusted to a line pressure $P_L$ by a regulator valve (not shown) connected to the oil passage a4.

On the other hand, the mechanical oil pump 21 that is driven by the internal combustion engine 2 or the motor 3 as mentioned above generates a hydraulic pressure $P_{MOP}$ corresponding to the specifications (design) of the mechanical oil pump 21 in the oil passages a1, a2, a3, and a4 and adjusted to the line pressure $P_L$ by the regulator valve (not shown) connected to the oil passage a4 in the same manner.

The hydraulic pressure $P_{MOP}$ that is generated by the mechanical oil pump 21 is greater than the hydraulic pressure $P_{EOP}$ that is generated by the electrically powered oil pump 22 due to their designs. In a case in which the mechanical oil pump 21 and the electrically powered oil pump 22 are driven at the same time, the check ball 42 closes and the hydraulic pressure $P_{MOP}$ of the mechanical oil pump 21 is adjusted to the line pressure $P_L$ by the regulator valve (not shown).

In addition, the oil passage a4 is connected to a hydraulic pressure control circuit and a lubrication circuit (none of which is shown) of the speed change mechanism 5, etc. Oil control and lubrication for the speed change mechanism 5 are performed using the line pressure $P_L$ of the oil passage a4 as a source pressure.

The aforementioned oil passage a3 is connected to a parking release switching part that generates (supplies) or stops a release pressure of the hydraulic pressure actuator 45 for performing a P-out (parking release) at the parking mechanism that is described later. The parking release switching part is configured to include a release pressure switching valve 41 and a solenoid valve S1 that is capable of outputting a signal pressure $P_{S1}$ to switch the release pressure switching valve 41.

More specifically, the release pressure switching valve 41 is configured to include a spool 41p, a spring 41s that urges the spool 41p toward one direction, an input port 41a, a blocking port 41b, and an output port 41c. In a case in which the spool 41p is urged by the urged force of the spring 41s and positioned at an upper side of the figure, the input port 41a is allowed to communicate with the blocking port 41b. In a case in which the signal pressure $P_{S1}$ is inputted from the solenoid valve S1 and the spool 41p is positioned at a lower side of the figure, the input port 41a is allowed to communicate with the output port 41c. The oil passage c1 connected to the output port 41c is connected to the input port 46a of the cylinder 46 of the hydraulic pressure actuator 45.

At the hydraulic pressure control device 40 and the parking mechanism 50 configured as above, in a case in which the shift lever 35 is selected to the P-range for example, the control unit 31 sets the solenoid valve S1 off and the signal pressure $P_{S1}$ is not outputted. Thus, the spool 41p of the release pressure switching valve 41 is positioned at an upper side of the figure by the urged force of the spring 41s, and the line pressure $P_L$ inputted to the input port 41a via the oil passage a3 is blocked by the blocking port 41b. Thereby, even in a case in which the mechanical oil pump 21 or the electrically powered oil pump 22 are driven, the line pressure $P_L$ is not supplied to the hydraulic oil chamber 48 of the hydraulic pressure actuator 45 as a release hydraulic pressure $P_{NOT}$.

Thereby, the piston 47 becomes in a free state. Therefore, the piston rod 58, the rotating lever 56, and the parking rod 55 that are drivingly coupled are pressed by the urged force of the coil spring 54. The piston rod 58 is pressed and moved in the X1 direction, the rotating lever 56 in the ω1 direction, and the parking rod 55 in the X2 direction, respectively. Thus, the cam 53 abuts on the parking pawl 52 and presses in the Y1 direction, which causes the parking pawl 52 and the parking gear 51 to become in a meshable state (not meshed at a certain position of the tooth, and meshed when the phase matches).

On the other hand, in a case in which the shift lever 35 is selected to a non-parking range other than the P-range, that is, any one of the R-range, the N range, and the D-range for example, the control unit 31 sets the solenoid valve S1 on and the signal pressure $P_{S1}$ is outputted. Thus, the spool 41p of the release pressure switching valve 41 is positioned at the lower side of the figure against the urged force of the spring 41s, and the line pressure $P_L$ inputted to the input port 41a via the oil passage a3 is supplied from the output port 41c to the oil passage c1 and supplied to the hydraulic oil chamber 48. Thereby, in a case in which the mechanical oil pump 21 is stopped and the electrically powered oil pump 22 is driven, the line pressure $P_L$ being relatively low that is derived from the hydraulic pressure $P_{EOP}$ generated by the electrically powered oil pump 22 is supplied to the hydraulic oil chamber as a release hydraulic pressure $P_{NOT}$. In a case in which the mechanical oil pump 21 is driven, the line pressure $P_L$ being high (being higher than the line pressure $P_L$ derived from the pressure $P_{EOP}$ of the electrically powered oil pump 22) that is derived from the hydraulic pressure $P_{MOP}$ generated by the mechanical oil pump 21 is supplied to the hydraulic oil chamber as a release hydraulic pressure $P_{NOT}$.

Thereby, the piston 47 is urged in the X2 direction of the axial direction, and among the piston rod 58, the rotating lever 56, and the parking rod 55 that are drivingly coupled, the piston rod 58 is pressed and moved in the X2 direction, the rotating lever 56 in the ω2 direction, and the parking rod 55 in the X1 direction, respectively, against the urged force of the aforementioned coil spring 54. Therefore, the cam 53 is detached from the parking pawl 52, the parking pawl 52 is pressed in the Y2 direction by the spring (not shown), and the parking pawl 52 and the parking gear 51 becomes in an unmeshed state, that is, in a non-parking state.

Subsequently, control when releasing parking according to the present disclosure is explained with reference to FIG. 3. For example, when a driver sets an ignition on, the present control starts (S1), and initially, whether the internal combustion engine 2 is driven or not is determined (S2). That is, when the ignition is set to on, the control unit 31 determines whether to cause the internal combustion engine 2 to be driven, for example, based on a state of a battery remaining amount, an operating state of auxiliary devices (for example, air conditioner), etc., and the internal combustion engine 2 is controlled to be driven or stopped.

For example, in a case in which the internal combustion engine 2 is caused to be driven after the ignition is set to on, it is determined that the internal combustion engine 2 is driven (S2: Yes), and the procedure proceeds to Step S3. In such a manner, in a case in which the internal combustion engine 2 is driven, the mechanical oil pump 21 is driven.

Therefore, the line pressure $P_L$ is a high hydraulic pressure derived from the $P_{MOP}$ generated by the mechanical oil pump 21.

At Step S3, for example, it is determined whether a selection operation by the driver on the shift lever 35 corresponds to the P-range. In a case in which the selection operation does not correspond to the P-range (S3: No), the procedure returns (S21). In a case in which the selection operation corresponds to the P-range (S3: Yes), the control unit 31 waits until a selection operation, for example, by the driver on the shift lever 35 is accepted (S4: No). In a case in which the control unit 31 accepts that a non-parking range, that is, any one of the R-range, N range, and D-range is selected from the P-range (S4: Yes), the control unit 31 sets the solenoid valve S1 on and switches the release pressure switching valve 41 to the lower position of FIG. 2, supplies the aforementioned high line pressure $P_L$ to the hydraulic oil chamber 48 of the hydraulic pressure actuator 45, and causes the piston 47 to be driven by the high line pressure $P_L$ (activates P-out piston operation) irrespective of an inclination state of the vehicle 100 as described in detail later (SS5). Thereafter, it is determined with the P-out sensor 33 that detects the rotation angle position of the manual shaft 57 whether a P-out state in which the parking pawl 52 is unmeshed from the parking gear 51 is established (S6). The control unit 31 waits until the P-out state is established (S6: No). In a case in which the P-out state is established, the procedure proceeds to S20.

At Step S20, for example, in a case in which the aforementioned selection operation of the shift lever 35 corresponds to the N range, the speed change mechanism 5 is brought into a neutral state while keeping the clutch C-1 and other friction engagement elements of the speed change mechanism 5 disengaged, that is, a state in which the power transmission path of the speed change mechanism 5 is disconnected. In addition, in a case in which the aforementioned selection operation of the shift lever 35 corresponds to the R-range, the friction engagement element (it may be the clutch C-1 depending on the configuration of the speed change mechanism 5) that establishes the backward speed shift of the speed change mechanism 5 is caused to be engaged, that is, a state in which the power transmission path of the speed change mechanism 5 is connected is established, and the speed change mechanism 5 is brought into a state of the backward shift speed. Further, in a case in which the aforementioned selection operation of the shift lever 35 corresponds to the D-range, the clutch C-1 and/or the other friction engagement elements (such as one-way clutch, etc.) that establishes the forward shift speed of the speed change mechanism 5 is caused to be engaged, that is a state in which the power transmission path of the speed change mechanism 5 is connected is established, and the speed change mechanism 5 is brought into a state of the forward shift speed.

In such a manner, at Step S20, in a case in which the speed change mechanism 5 is brought into a state that corresponds to each range and the transition completes, the control unit 31 terminates the P-out control while the internal combustion engine 2 is driven, and the procedure returns (S21).

On the other hand, at the aforementioned Step S2, in a case in which it is determined that the internal combustion engine 2 is stopped (S2: No), the procedure proceeds to Step S7. In the same manner as Step S3, it is determined whether the selection operation for example by the driver on the shift lever 35 corresponds to the P-range. In a case in which the selection operation does not correspond to the P-range (S7: No), the procedure returns (S21). In a case in which the selection operation corresponds to the P-range (S7: Yes), an inclination angle of the vehicle 100 is detected by the vehicle inclination sensor 32 (S8) and the procedure proceeds to S9. At Step S9, the control unit 31 waits until the selection operation for example by the driver on the shift lever 35 is accepted (S9: No). In a case in which the control unit 31 accepts that a non-parking range, that is, any one of the R-range, N range, and D-range is selected from the P-range (S9: Yes), the procedure proceeds to S10. In a case in which the ignition is set to on and the internal combustion engine 2 is stopped, the mechanical oil pump 21 is stopped unless the vehicle is in an EV travel. Therefore, the electrically powered oil pump 22 is caused to be driven.

In the present control, it is determined whether the inclination angle of the vehicle 100 detected by the vehicle inclination sensor 32 is equal to or greater than a predetermined angle (the inclination angle is greater than the predetermined inclination angle) or the inclination angle of the vehicle 100 is less than the predetermined angle (the inclination angle is less than the predetermined inclination angle) (S10). In a case in which the inclination angle of the vehicle 100 is less than the predetermined angle (S10: No), a meshing portion of the parking gear 51 and the parking pawl 52 does not receive a vehicle weight so much. Therefore, a sliding resistance between the parking pawl 52 and the parking rod 55 (cam 53) is small. Consequently, a small driving force is sufficient as the driving force that is driven by the hydraulic pressure actuator 45.

Then, in a case in which the inclination angle of the vehicle 100 is less than the predetermined angle (S10: No), the control unit 31 sets the electrically powered oil pump 22 on with the mechanical oil pump 21 (i.e., the internal combustion engine 2 and the motor 3) being stopped (S11), sets the solenoid valve S1 on to switch the release pressure switching valve 41 to the lower position of FIG. 2, and supplies a low line pressure $P_L$ to the hydraulic oil chamber 48 of the hydraulic pressure actuator 45, and causes the piston 47 to be driven by the low line pressure $P_L$ (activates the P-out piston operation) (S12).

Thereafter, the control unit 31 determines using the P-out sensor 33 that detects the rotation angle position of the manual shaft 57 whether the P-out state is established in which the parking pawl 52 is unmeshed from the parking gear 51 (S13), waits until the P-out state is established (S13: No). In a case in which the P-out state is established (S13: Yes), the procedure proceeds to Step S20. At Step S20, the speed change mechanism 5 is brought into a state that corresponds to each range as mentioned above and the transition completes, the control unit 31 terminates the P-out control using the hydraulic pressure $P_{EOP}$ of the electrically powered oil pump 22 while the internal combustion engine 2 is stopped, and the procedure returns (S21).

In such a manner, in a case in which the inclination of the vehicle 100 is less than the predetermined angle, the internal combustion engine 2 and the motor 3 are not caused to be driven and the P-out control is performed with the hydraulic pressure $P_{EOP}$ that is generated by the electrically powered oil pump 22. Therefore, it is possible to suppress consumption of fuel and consumption of a battery. Thereby, it is possible to help improvement of fuel efficiency (electricity efficiency) of the vehicle 100.

On the other hand, at Step S10, in a case in which the inclination angle of the vehicle 100 is equal to or greater than the predetermined angle (S10: Yes), the vehicle weight acts on the meshing portion of the parking gear 51 and the parking pawl 52. Therefore, the sliding resistance between the parking pawl 52 and the parking rod 55 (cam 53) is large.

Thus, a large force is required as the driving force that is driven by the hydraulic pressure actuator 45.

Then, in a case in which the inclination angle of the vehicle 100 is equal to or greater than the predetermined angle (S10: Yes), the control unit 31 causes the internal combustion engine 2 or the motor 3 serving as the driving source to be driven (S14), causes the mechanical oil pump 21 to be driven (on) and the electrically powered oil pump 22 to be stopped (off) (S15). At this moment, it is preferable to determine whether to cause the internal combustion engine 2 to be driven or the motor 3 to be driven based on, for example, a state of a battery remaining amount, an operating state of auxiliary devices, etc. However, it is further preferable to cause the motor 3 to be driven because the motor 3 requires less response time compared to the internal combustion engine 2.

Subsequently, the control unit 31 sets the solenoid valve S1 on to switch the release pressure switching valve 41 to the lower position of FIG. 2, supplies the high line pressure $P_L$ derived from the hydraulic pressure $P_{MOP}$ of the mechanical oil pump 21 to the hydraulic oil chamber 48 of the hydraulic pressure actuator 45, and causes the piston 47 to be driven by the high line pressure $P_L$ (activates the P-out piston operation) (S16).

Thereafter, it is determined with the P-out sensor that detects the rotation angle position of the manual shaft 57 whether the P-out state in which the parking pawl 52 is unmeshed from the parking gear 51 is established (S17). The control unit 31 waits until the P-out state is established (S17: No). In a case in which the P-out state is established (S17: Yes), the control unit 31 causes the electrically powered oil pump 22 to be driven again (S18), causes the internal combustion engine 2 or the motor 3 serving as the driving source to be stopped to cause the mechanical oil pump 21 to be stopped (S19), and the procedure proceeds to Step S20. At Step S20, as described above, the speed change mechanism 5 is brought into a state that corresponds to each range and the transition completes, and the control unit 31 terminates the P-out control using the hydraulic pressure $P_{MOP}$ of the mechanical oil pump 21 while the internal combustion engine 2 is stopped, and the procedure returns (S21).

In such a manner, in a case in which the inclination angle of the vehicle 100 is equal to or greater than the predetermined angle, the P-out control is performed by causing the internal combustion engine 2 or the motor 3 to be driven to change the hydraulic pressure $P_{EOP}$, which is generated by the electrically powered oil pump 22 and not sufficient, to a higher hydraulic pressure that is generated by the mechanical oil pump 21. Therefore, it is becomes unnecessary to enlarge the electrically powered oil pump 22 to generate a high hydraulic pressure with the electrically powered oil pump 22. Thereby, it is possible to help cost-down and down-sizing.

Figure 3:
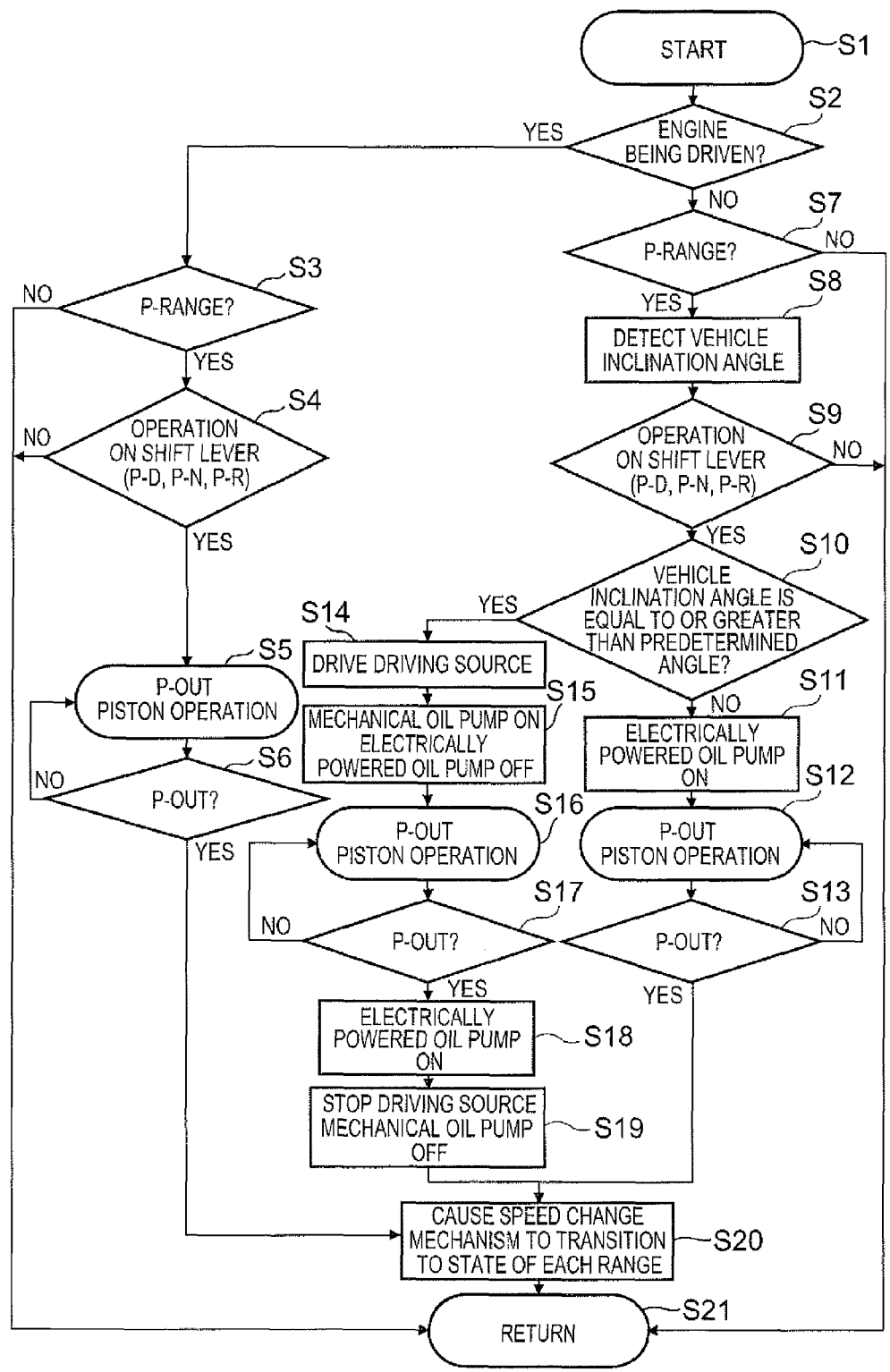
FIG. 3 is a flowchart that shows control when releasing parking according to the first embodiment.

In addition, in the control when releasing parking shown in FIG. 3 as described above, it is determined at Step S10 whether the inclination angle of the vehicle 100 is equal to or greater than the predetermined angle. However, the determination in a case in which the inclination angle of the vehicle 100 is equal to the predetermined angle is optional. For example, the determination may be performed under conditions such as "in a case in which the inclination angle is greater than the predetermined angle" and "in a case in which the inclination angle is equal to or less than the predetermined angle."

As described above, according to the present hybrid drive device 1, when the non-parking range is selected by an operation on the shift lever 35 from the P-range while the internal combustion engine 2 is stopped (practically, the motor 3 is not driven in the P-range), in a case in which it is determined that the inclination of the vehicle 100 is less than the predetermined inclination angle, the hydraulic pressure control device 40 is controlled so as to supply the release hydraulic pressure $P_{NOT}$ derived from the hydraulic pressure $P_{EOM}$ generated by the electrically powered oil pump 22 to the hydraulic pressure actuator 45. In a case in which it is determined that the inclination of the vehicle 100 is greater than the predetermined inclination angle, the hydraulic pressure control device 40 is controlled so as to cause the internal combustion engine 2 or the motor 3 to be driven to cause the mechanical oil pump 21 to be driven thereby supplying the release hydraulic pressure $P_{NOT}$ derived from the hydraulic pressure $P_{MOP}$ generated by the mechanical oil pump 21 to the hydraulic pressure actuator 45.

Thereby, in a case in which the inclination of the vehicle 100 is less than the predetermined inclination, it is possible to unmesh the parking pawl 52 from the parking gear 51 by the hydraulic pressure $P_{EOP}$ of the electrically powered oil pump 22 with the internal combustion engine 2 and the motor 3 being stopped. Thus, it becomes possible to make it unnecessary to cause the internal combustion engine 2 and the motor 3 to be driven. Thereby, it is possible to help the improvement of the fuel efficiency (electricity efficiency) of the vehicle 100. In addition, in a case in which the inclination of the vehicle 100 is greater than the predetermined inclination angle, the sliding resistance to unmesh the parking pawl 52 from the parking gear 51 is large. Therefore, a high release hydraulic pressure $P_{NOT}$ is required. However, by driving the internal combustion engine 2 and the motor 3 to drive the mechanical oil pump 21, it is possible to unmesh the parking pawl 52 from the parking gear 51 by a high hydraulic pressure $P_{MOP}$ generated by the mechanical oil pump 21. Therefore, it is possible to prevent the electrically powered oil pump 22 from being enlarged, and help the cost-down and down-sizing.

In addition, in the present embodiment, it is described as an example that the mechanical oil pump 21 is utilized as the first oil pump having a large capacity and the electrically powered oil pump 22 is utilized as the second oil pump having a small capacity. For example, the combination may be a mechanical oil pump having a large capacity and a mechanical oil pump having a small capacity that are both driven by the internal combustion engine 2, and an electrically powered oil pump having a large capacity and an electrically powered oil pump having a small capacity that are both driven by an electric motor that is different from the driving source. Even in such a configuration, in a case in which the inclination of the vehicle is less than the predetermined inclination angle, it is possible to unmesh the parking pawl from the parking gear by the hydraulic pressure of the second oil pump having a small capacity. Thereby, it is possible to make an energy loss small and help the improvement of the fuel efficiency (electricity efficiency) of the vehicle. In addition, in a case in which the inclination of the vehicle is greater than the predetermined inclination angle, the sliding resistance to unmesh the parking pawl from the parking gear is large. Thus, a high release hydraulic pressure is required. However, by driving the first oil pump having a large capacity, it is possible to unmesh the parking pawl from the parking gear by a high hydraulic pressure generated by the first oil pump. Therefore, it is possible to prevent the second oil pump from being enlarged, and help the cost-down and the down-sizing.

In addition, in a case in which it is determined that the inclination of the vehicle 100 is greater than the predetermined inclination angle and the mechanical oil pump 21 is caused to be driven by causing the internal combustion engine 2 or the motor 3 to be driven, when the P-out sensor 33 detects unmeshing between the parking pawl 52 and the parking gear 51, the internal combustion engine 2 or the motor 3 is caused to be stopped. Therefore, it is possible to reliably unmesh the parking pawl 52 from the parking gear 51. Also, unnecessary driving of the internal combustion engine 2 and the motor 3 can be eliminated. Thereby, it is possible to help the improvement of the fuel efficiency (electricity efficiency) of the vehicle 100.

Further, when a non-parking range is selected on the shift lever 35 from the P-range while the internal combustion engine 2 is stopped, in a case in which it is determined that the inclination of the vehicle 100 is greater than the predetermined inclination angle, the hydraulic pressure control device 40 is controlled such that, with the power transmission path being disconnected by the clutch C-1, the internal combustion engine 2 or the motor 3 is caused to be driven to cause the mechanical oil pump 21 to be driven, thereby the release hydraulic pressure $P_{NOT}$ derived from the hydraulic pressure $P_{MOP}$ generated by the mechanical oil pump 21 is supplied to the hydraulic pressure actuator 45. Therefore, even when the internal combustion engine 2 or the motor 3 is caused to be driven, it is possible to prevent the driving force from being transmitted to the wheels 9 because the power transmission path is disconnected by the clutch C-1. That is, without causing the vehicle 100 to be driven, it is possible to unmesh the parking pawl 52 from the parking gear 51 by a high hydraulic pressure $P_{MOP}$ generated by the mechanical oil pump 21.

In addition, when the R-range or the D-range among the non-parking ranges is selected on the shift lever 35 from the P-range, the clutch C-1 etc. of the speed change mechanism 5 is engaged after especially the motor 3 has been stopped. Therefore, after the speed change mechanism 5 is brought into a state of the travel range, the vehicle 100 can be started by the motor 3, etc.

The electrically powered oil pump 22 is an oil pump that supplies a hydraulic pressure to the hydraulic pressure control device 40 while the internal combustion engine 2 is stopped. Therefore, it is possible to eliminate to provide an oil pump exclusive to generate only a hydraulic pressure to unmesh the parking pawl 52 from the parking gear 51.

Second Embodiment

Figure 4:
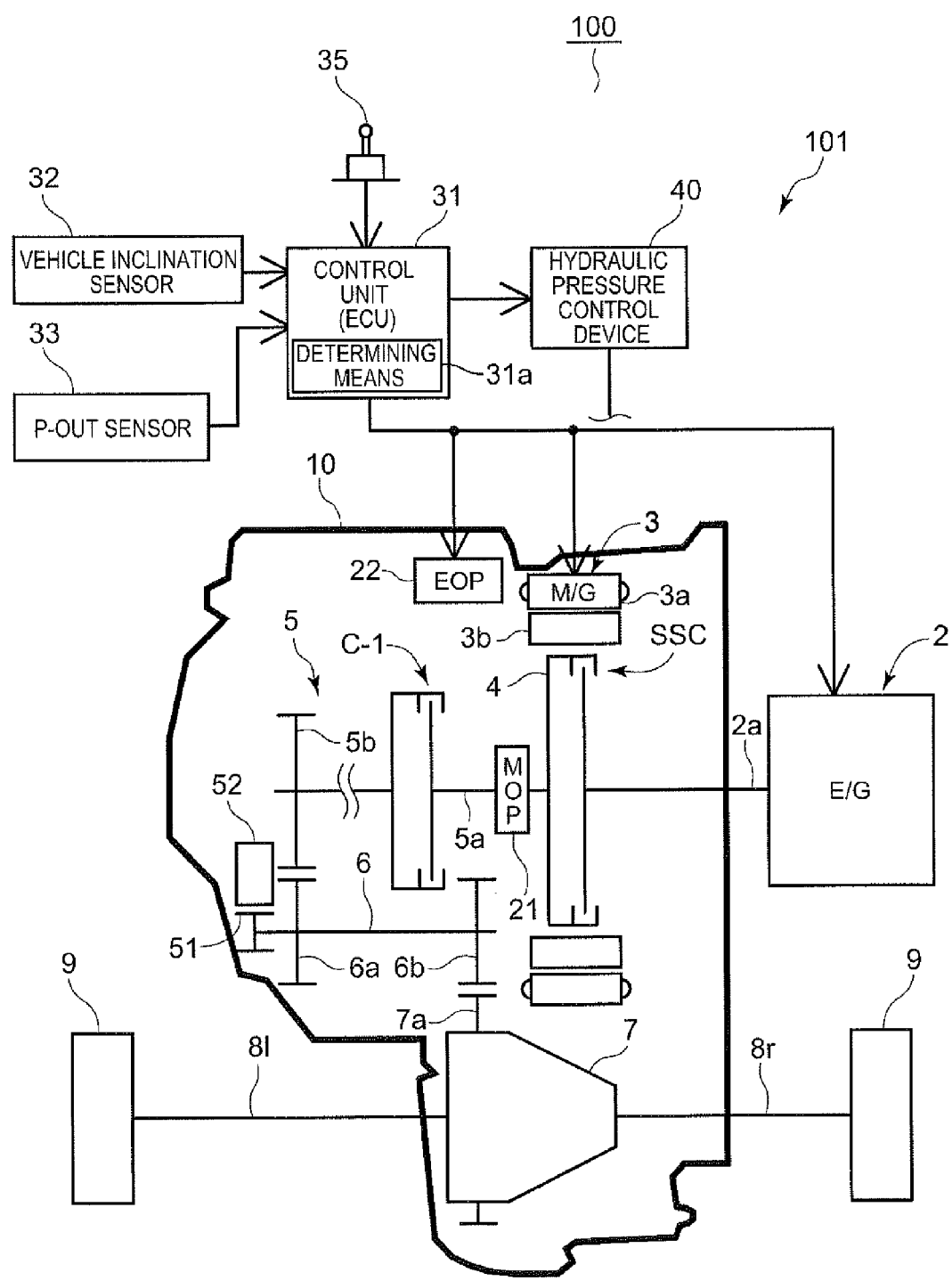
FIG. 4 is a schematic view that shows a vehicle according to a second embodiment.

Subsequently, a second embodiment, which is an embodiment partly changed from the first embodiment, is explained with reference to FIG. 4. Note that, in the description of the second embodiment, like reference numbers are assigned like elements as the first embodiment, for which the description is not given.

As for a hybrid drive device 101 according to the second embodiment, an allocation of the mechanical oil pump 21 and a drive coupling configuration are changed compared to the hybrid drive device 1 according to the first embodiment. As shown in FIG. 4, the mechanical oil pump 21 in the hybrid drive device 101 is drivingly coupled and placed such that the drive gear interlocks with the speed change mechanism 5a. During the EV travel by a driving force of the motor 3 with the engine connection clutch SSC being released, the mechanical oil pump 21 placed in such a manner is rotatably driven by the driving force of the motor 3 to generate a hydraulic pressure. During a hybrid travel by a driving force of the internal combustion engine 2 or the motor 3 with the engine connection clutch SSC being engaged, the mechanical oil pump 21 is rotatably driven by the driving force of the internal combustion engine 2 or the motor 3 to generate a hydraulic pressure.

Consequently, in the second embodiment, when the non-parking range is selected from the P-range, in a case in which the inclination angle of the vehicle 100, for example, in an idle-stop state (while the internal combustion engine 2 is stopped) is less than the predetermined angle, the parking pawl 52 is unmeshed from the parking gear 51 using the hydraulic pressure $P_{EOP}$ of the electrically powered oil pump 22. In a case in which the inclination angle of the vehicle 100 is equal to or greater than the predetermined angle and the parking pawl 52 is unmeshed from the parking gear 51 using the hydraulic pressure $P_{MOP}$ of the mechanical oil pump 21, with the engine connection clutch SSC being engaged and the clutch C-1 of the speed change mechanism 5 being released, the internal combustion engine 2 is caused to be driven to cause the mechanical oil pump 21 to be driven. Alternately, with the engine connection clutch SSC and the clutch C-1 of the speed change mechanism 5 being released, the motor 3 is caused to be driven to cause the mechanical oil pump 21 to be driven.

Configurations, operation, effects other than the above are the same as those of the first embodiment. Therefore, description is not given.

Third Embodiment

Subsequently, a third embodiment, which is an embodiment partly changed from the first embodiment, is explained with reference to FIG. 5. Note that, in the description of the third embodiment, like reference numbers are assigned like elements as the first embodiment, for which the description is not given. In addition, a mechanical oil pump 221, an electrically powered oil pump 222, a parking gear 251, and a parking pawl 252 shown in FIG. 5 have the same configuration as the mechanical oil pump 21, the electrically powered oil pump 22, the parking gear 51, and the parking pawl 52, and these are regarded as replacements respectively. Therefore, the description is not given.

In the third embodiment, the present disclosure is applied to an automatic transmission 201 that is in a vehicle 200 capable of performing an idle-stop and provided with: the electrically powered oil pump (the second oil pump) 222 that generates a hydraulic pressure to bring the clutch C-1, etc. of a speed change mechanism 205 into an engaged state to form a transmission path for example in a state in which the internal combustion engine 2 is in an idle stop state while the vehicle 200 is stopped; and the mechanical oil pump (first oil pump) 221 that is driven in conjunction with the internal combustion engine 2.

Figure 5:
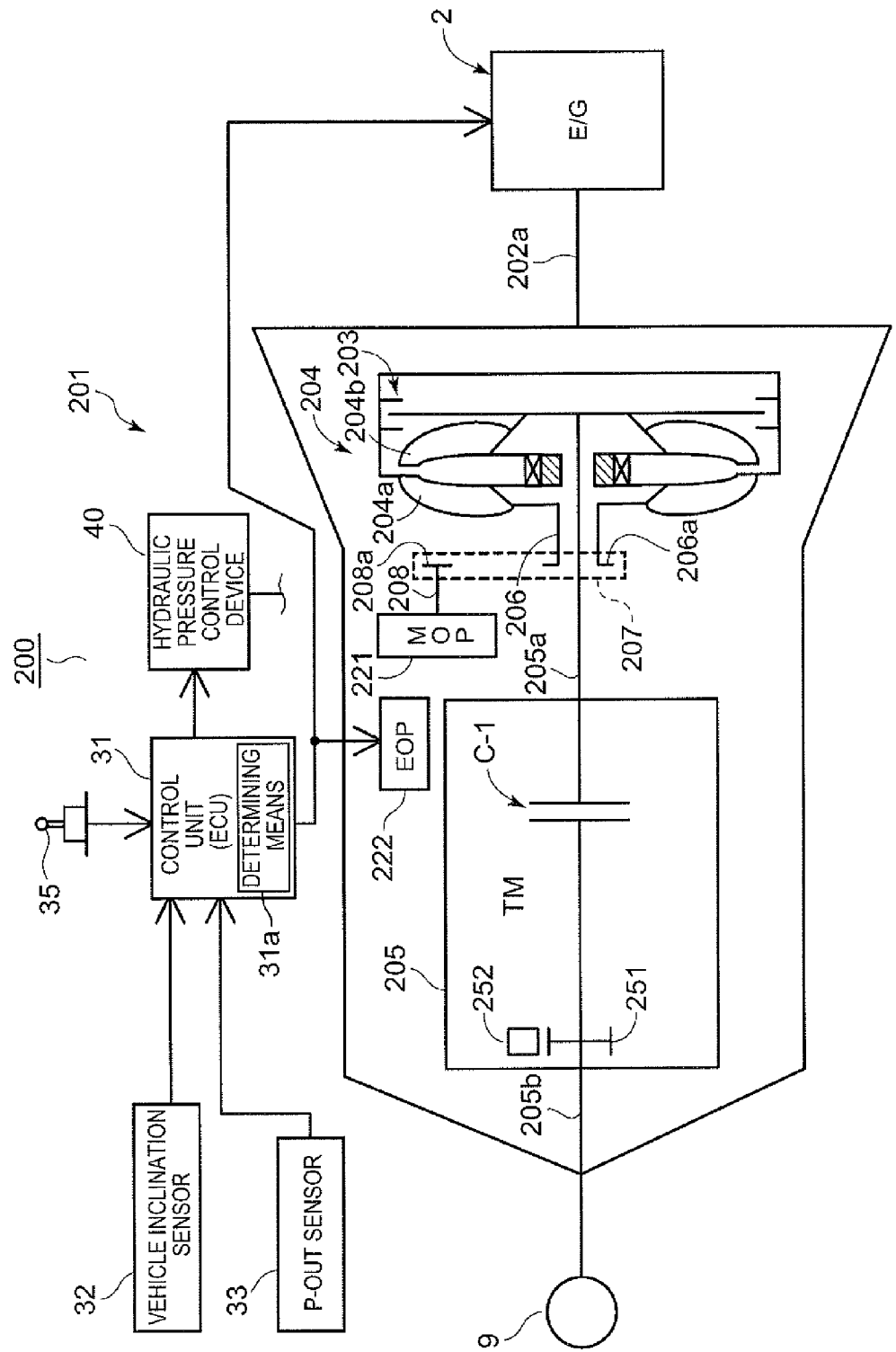
FIG. 5 is a schematic view that shows a vehicle according to a third embodiment.

In detail, as shown in FIG. 5, the vehicle 200 is, for example, a FR (front-engine, rear-wheel drive) type vehicle and includes the internal combustion engine 2 as a driving source. The automatic transmission (vehicular power transmission device) 201 drivingly coupled with the internal combustion engine 2 includes an input shaft 202a that is drivingly coupled with the internal combustion engine 2. The input shaft 202a is connected to a pump impeller 204a of a torque converter 204. The torque converter 204 generally includes the pump impeller 204a, a turbine runner 204b that is placed facing the pump impeller 204a and connected to the input shaft 205a of the speed change mechanism 205, and a lock-up clutch 203 that engages the input shaft 202a with the input shaft 205a to bring into a directly connected state. The torque converter 204 is configured to be filled with oil inside to become in an oil-tight manner.

The speed change mechanism 205 includes a speed change mechanism that is capable of establishing a plurality of forward shift speeds and a backward shift speed by changing the transmission path based on the engagement state of a plurality of friction engagement elements (clutch and brake) including the clutch C-1. The output shaft 205b of the speed change mechanism 205 is drivingly coupled with the wheels 9 through a propeller shaft, a differential device, etc. In addition, the output shaft 205b is fixed to the parking gear 251 that is placed facing the parking pawl 252. That is, the parking gear 251 is drivingly coupled with the wheels 9. Note that the speed change mechanism 205 may be for example a stepped speed change mechanism that establishes 3 or more forward shift speeds, or a continuously variable speed change mechanism such as a belt type continuously variable transmission, a toroidal type continuously variable transmission, a ring-cone type continuously variable transmission, etc. The speed change mechanism 205 may be any speed change mechanism as far as it includes especially a friction engagement element capable of connecting and disconnecting the power transmission path.

The pump impeller 204a of the torque converter 204 is coupled with a driving shaft 206 and drivingly coupled with a driving shaft 208 that is coupled with a driver gear of the mechanical oil pump 221 through a sprocket 206a coupled with the driving shaft 206, a chain 207 engaged with the sprocket 206a, and a sprocket 208a engaged with the chain 207. Consequently, the mechanical oil pump 221 is drivingly coupled with the internal combustion engine 2 so as to be interlocked. In addition, the electrically powered oil pump 222 is configured to have a capacity smaller than the mechanical oil pump 221, and configured to be capable of being electrically driven by an electric motor (not shown) independently of the mechanical oil pump 221, and controlled to be driven and stopped based on an electric command from the control unit 31. The electrically powered oil pump 222 originally supplies a hydraulic pressure to the hydraulic pressure control device 40 for example during an idle-stop state while the vehicle 200 is stopped, and generates a hydraulic pressure to engage the friction engagement elements in the speed change mechanism 205 to form a transmission path and a hydraulic pressure to lubricate the speed change mechanism 205, etc.

Consequently, in the third embodiment, when the non-parking range is selected by an operation from the P-range, in a case in which the inclination angle of the vehicle 200 for example in an idle-stop state (while the internal combustion engine 2 is stopped) is less than the predetermined angle, the parking pawl 252 is unmeshed from the parking gear 251 using the hydraulic pressure $P_{EOP}$ of the electrically powered oil pump 222. In a case in which the inclination angle of the vehicle 200 is equal to or greater than the predetermined angle and the parking pawl 252 is unmeshed from the parking gear 251 using the hydraulic pressure $P_{MOP}$ of the mechanical oil pump 21, with the clutch C-1 of the speed change mechanism 205 being released, the internal combustion engine 2 is caused to be driven to cause the mechanical oil pump 21 to be driven, thereby the mechanical oil pump 221 is caused to be driven.

Configurations, operation, effects other than the above are the same as those of the first embodiment. Therefore, description is not given.

Fourth Embodiment

Figure 6:
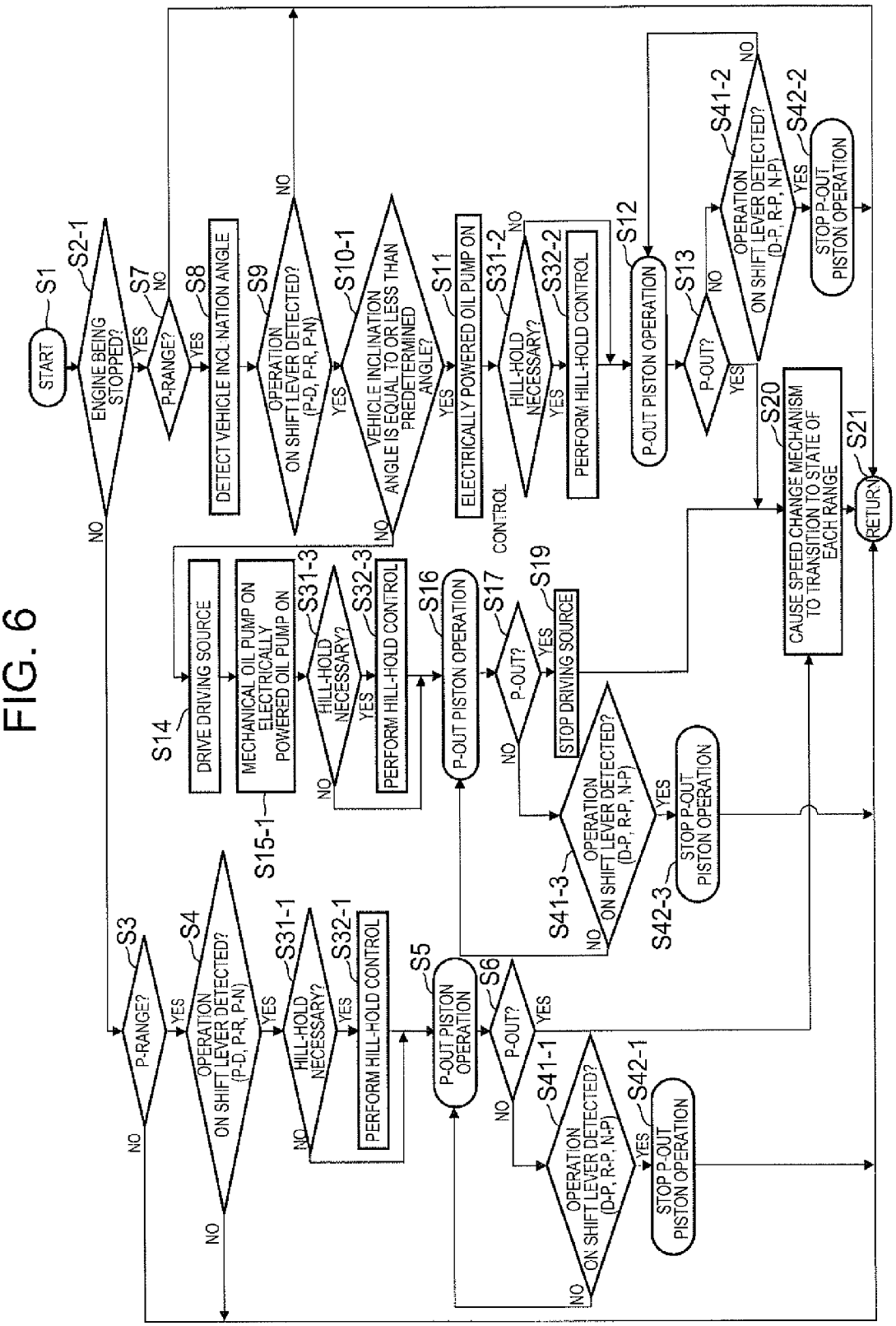
FIG. 6 is a flowchart that shows control when releasing parking according to a fourth embodiment.

Subsequently, a fourth embodiment, which is an embodiment partly changed from the first embodiment, is explained with reference to FIG. 6. Note that, in the description of the fourth embodiment, like reference numbers are assigned like elements as the first embodiment, for which the description is not given. In addition, as for the flowchart shown in FIG. 6, the control is substantially the same as the control shown in FIG. 2 at Steps S1 to S21. Therefore, the description is given in a simple manner, and the control portion newly added with respect to the control in FIG. 2 is mainly described.

In the control when releasing parking according to the fourth embodiment, compared to the first embodiment, before activating the P-out piston operation (S5, S16, S12) (that is, before unmeshing the parking pawl 52 from the parking gear 51), it is determined whether hill hold control is necessary (S31-1, S31-2, S31-3), and in a case in which it is necessary, the hill hold control is performed (S32-1, S32-2, S32-3). In addition, the control when releasing parking in the fourth embodiment, compared to the first embodiment, during the P-out piston operation (before a P-out is detected), in a case in which it is detected that the P-range is selected back by an operation on the shift lever 35 (S41-1, S41-2, S41-3), it is configured to stop the P-out piston operation to maintain the parking state (S42-1, S42-2, S42-3). Note that, "-1" is added for Step S2, Step S10, Step S15 which are similar in operation to steps in FIG. 3 but include changes in FIG. 6 to distinguish from the steps in FIG. 3.

In detail, the control unit 31 starts the present control (S1), and it is initially determined whether the internal combustion engine 2 is stopped (S2-1). For example, in a case in which the internal combustion engine 2 is driven, it is determined that the engine is not stopped (S2-1: Yes) and the procedure proceeds to Step S3. At Step S3, it is determined whether the shift lever 35 corresponds to the P-range. In a case in which the shift lever 35 does not correspond to the P-range (S3: No), the procedure returns (S21). In a case in which the shift lever 35 corresponds to the P-range (S3: Yes), the control unit 31 waits until a selection operation on the shift lever 35 is accepted (S4: No). In a case in which it is accepted that a non-parking range, that is, any one of the R-range, N range, and D-range is selected from the P-range (S4: Yes), the procedure proceeds to Step S31-1.

At Step S31-1, it is determined based on the inclination angle of the vehicle 100 whether the hill hold control is necessary. That is, it is determined whether the vehicle 100 will be moved in a case in which the P-out control is performed when the vehicle 100 is stopped for example on a hill, based on whether the inclination angle of the vehicle 100 is greater than an angle that requires the hill hold control. In a case in which the inclination angle of the vehicle 100 is less than the angle that requires the hill hold control, the vehicle 100 is less likely to be moved. Therefore, it is determined that the hill hold control is not necessary (S31-1: No), the procedure proceeds to Step S5, and the P-out control operation is started. On the other hand, in a case in which the inclination angle of the vehicle 100 is greater than the angle that requires the hill hold control, the vehicle 100 is likely to be moved. Therefore, it is determined that the hill hold control is necessary (S31-1: Yes), the hill hold control is performed (S32-1) and the procedure proceeds to Step S5.

In the hill hold control at the aforementioned Step S32-1, the wheels 9 are forced to be fixed, for example, by engaging a brake that is capable of stopping a rotational state of a transmission path among the friction engagement elements of the speed change mechanism 5, etc., by setting the brake that is provided inside the wheels 9 on, or by setting a parking brake on. Note that the hill hold control is executed, for example, until an operation indicating a starting intention by the driver (for example, a braking pedal off, etc.) is detected, or the P-range is selected back as mentioned below.

Thereafter, when the procedure proceeds to Step S5, the P-out piston operation is activated by the high line pressure $P_L$ derived from the hydraulic pressure generated by the mechanical oil pump 21 in this case (S6), the determination by the P-out sensor 33 of whether the P-out state is established is started (S6), and the control unit 31 waits until the P-out state is established (S6: No). While waiting until the P-out state is established, it is continually determined whether an operation on the shift lever 35 to select the P-range back has been detected (S41-1). In a case in which the P-range is not selected back (S41-1: No), the P-out piston operation continues. Here, for example, in a case in which the operation to select the P-range back is detected (S41-1: Yes), the P-out piston operation is caused to be stopped (S42-1), a state in which the parking pawl 52 is meshed with the parking gear 51 is established again, and the procedure returns (S21). Specifically, when stopping the P-out piston operation, the supply of the line pressure $P_L$ with respect to the hydraulic oil chamber 48 of the hydraulic pressure actuator 45 is blocked by setting the solenoid valve S1 off and switching the release pressure switching valve 41 (back) to block the line pressure $P_L$, and the parking pawl 52 and the parking gear 51 are brought back into the meshable state by the urged force of the coil spring 54 (refer to FIG. 2).

In addition, in a case in which, while waiting until the P-out state is established, the operation on the shift lever 35 to select the P-range back is not detected (S41-1: No), and thereafter, it is determined based on the detection of the P-out sensor 33 that the P-out state in which the parking pawl 52 is unmeshed from the parking gear 51 is established (S6: Yes), the procedure proceeds to Step S20. The speed change mechanism 5 is brought into the state that corresponds to each range (S20) and the transition completes, that is, the P-out control while the internal combustion engine 2 is driven is terminated and the procedure returns (S21).

On the other hand, at the aforementioned Step S2-1, in a case in which it is determined that the internal combustion engine 2 is stopped (S2-1: Yes), the procedure proceeds to Step S7. In the same manner as Step S3, it is determined whether a selection operation for example by the driver on the shift lever 35 corresponds to the P-range. In a case in which the selection operation does not correspond to the P-range (S7: No), the procedure returns (S21). In a case in which the selection operation corresponds to the P-range (S7: Yes), the inclination angle of the vehicle 100 is detected with the vehicle inclination sensor 32 (S8) and the procedure proceeds to S9. At Step S9, the control unit 31 waits until the selection operation for example by the driver on the shift lever 35 is accepted (S9: No). In a case in which it is accepted that a non-parking range, that is, any one of the R-range, N-range, and D-range is selected from the P-range (S9: Yes), the procedure proceeds to S10. Note that in such a state, the electrically powered oil pump 22 is in a driving state because the internal combustion engine 2 is stopped and the mechanical oil pump 21 is stopped.

In the present control, it is determined whether the inclination angle of the vehicle 100 that is detected by the vehicle inclination sensor 32 is greater than a predetermined angle (whether the inclination angle is greater than a predetermined inclination angle) or the inclination angle is equal to or less than the predetermined angle (whether the inclination angle is less than the predetermined inclination angle) (S10-1). In a case in which the inclination angle of the vehicle 100 is equal to or less than the predetermined angle (S10-1: Yes), that is, the meshing portion of the parking gear 51 and the parking pawl 52 does not receive the vehicle weight so much, the sliding resistance between the parking pawl 52 and the parking rod 55 (cam 53) is small. Consequently, a small driving force is sufficient as the driving force that is driven by the hydraulic pressure actuator 45.

Thus, in a case in which the inclination angle of the vehicle 100 is equal to or less than the predetermined angle (S10: Yes), the control unit 31 sets the electrically powered oil pump 22 on with the mechanical oil pump 21 being stopped (S11) and the procedure proceeds to Step S31-2. At Step S31-2, in the same manner as Step S31-1, it is determined based on the inclination angle of the vehicle 100 whether the hill hold control is necessary. In a case in which the inclination angle of the vehicle 100 is less than an angle that requires the hill hold control, it is determined that the hill hold control is not necessary because the vehicle 100 is less likely to be moved (S31-2: No). Then, the procedure proceeds to Step S12 and the P-out piston operation is activated. On the other hand, in a case in which the inclination angle of the vehicle 100 is greater than the angle that requires the hill hold control, it is determined that the hill hold control is necessary because the vehicle 100 is likely to be moved (S31-2: Yes). Then, in the same manner as Step S32-1, the hill hold control is performed (S32-2), and thereafter, the procedure proceeds to Step S12.

At Step S12, the P-out piston operation is performed by a low line pressure $P_L$ derived from the hydraulic pressure generated by the electrically powered oil pump 22, a determination of whether the P-out state is established with the P-out sensor 33 is started (S13), and the control unit 31 waits until the P-out state is established (S13: No). While waiting until the P-out state is established, it is continually determined whether an operation on the shift lever 35 to select the P-range back is detected (S41-2). In a case in which the P-range is not selected back (S41-2: No), the P-out piston operation continues. Here, for example, in a case in which the operation to select the P-range back is detected (S41-2: Yes), the P-out piston operation is caused to be stopped (S42-2), a state in which the parking pawl 52 is meshed with the parking gear 51 is established again, and the procedure returns (S21).

In addition, in a case in which, while waiting until the P-out state is established, an operation on the shift lever 35 to select the P-range back is not detected (S41-2: No), and thereafter, it is determined based on the detection of the P-out sensor 33 that the P-out state in which the parking pawl 52 is unmeshed from the parking gear 51 is established (S13: Yes), the procedure proceeds to Step S20. The speed change mechanism 5 is brought into the state that corresponds to each range (S20) and the transition completes, that is, the P-out control using the hydraulic pressure $P_{EOP}$ of the electrically powered oil pump 22 while the internal combustion engine 2 is stopped is terminated, and the procedure returns (S21).

On the other hand, at Step S10-1, in a case in which the inclination angle of the vehicle 100 is greater than the predetermined angle (S10: No), the vehicle weight acts on the meshing portion of the parking gear 51 and the parking pawl 52. Therefore, the sliding resistance between the parking pawl 52 and the parking rod 55 (cam 53) is large. Thus, a large force is required as the driving force that is driven by the hydraulic pressure actuator 45.

Then, in a case in which the inclination angle of the vehicle 100 is equal to or greater than the predetermined angle (S10: No), the control unit 31 causes the internal combustion engine 2 or the motor 3 serving as the driving source to be driven (S14), causes the mechanical oil pump 21 to be driven (on) and the electrically powered oil pump 22 to keep driven (on) (515-1), and the procedure proceeds to Step S31-3.

Note that, at such moment, when the mechanical oil pump 21 is caused to be driven, the hydraulic pressure generated by the mechanical oil pump 21 exceeds the hydraulic pressure generated by the electrically powered oil pump 22. Thereby, the check ball 42 (refer to FIG. 2) closes, and it becomes unnecessary for the electrically powered oil pump 22 to generate a hydraulic pressure. However, in a case in which the mechanical oil pump 21 is caused to be stopped and the electrically powered oil pump 22 is caused to be driven again afterward, supply of the hydraulic pressure from the electrically powered oil pump 22 may be delayed. Therefore, by keeping the electrically powered oil pump 22 to be driven at the same time as the mechanical oil pump 21 being driven, it becomes possible to perform, in a short time, transition to a hydraulic pressure supply state by the electrically powered oil pump 22 after stopping the internal combustion engine 2 or the motor 3 and stopping the mechanical oil pump 21. Thus, it is possible to stop the internal combustion engine 2 or the motor 3 earlier. Thereby, it is possible to help the improvement of the fuel efficiency.

At Step S31-3, in the same manner as Step S31-1, it is determined based on the inclination angle of the vehicle 100 whether the hill hold control is necessary. In a case in which the inclination angle of the vehicle 100 is less than an angle that requires the hill hold control, the vehicle 100 is less likely to be moved. Therefore, it is determined that the hill hold control is not necessary (S31-3: No), the procedure proceeds to Step S16, and the P-out piston operation is started. On the other hand, in a case in which the inclination angle of the vehicle 100 is greater than the angle that requires the hill hold control, the vehicle 100 is likely to be moved. Therefore, it is determined that the hill hold control is necessary (S31-3: Yes), the hill hold control is performed (S32-3) and the procedure proceeds to Step S16 in the same manner as Step S32-1.

At Step S16, the P-out piston operation is performed by a high line pressure $P_L$ derived from the hydraulic pressure generated by the mechanical oil pump 21, a determination of whether the P-out state is established with the P-out sensor 33 is started (S17), and the control unit 31 waits until the P-out state is established (S17: No). While waiting until the P-out state is established, it is continually determined whether an operation on the shift lever 35 to select the P-range back is detected (S41-3). In a case in which the P-range is not selected back (S41-3: No), the P-out piston operation continues. Here, for example, in a case in which the operation to select the P-range back is detected (S41-3: Yes), the P-out piston operation is caused to be stopped (S42-3), a state in which the parking pawl 52 is meshed with the parking gear 51 is established again, and the procedure returns (S21).

In addition, in a case in which, while waiting until the P-out state is established, the operation on the shift lever 35 to select the P-range back is not detected (S41-3: No), and thereafter, it is determined based on the detection of the P-out sensor 33 that the P-out state in which the parking pawl 52 is unmeshed from the parking gear 51 is established (S17: Yes), the control unit 31 causes the internal combustion engine 2 or the motor 3 to be stopped to cause the mechanical oil pump 21 to be stopped (S19), and the procedure proceeds to Step S20. At Step S20, as described above, the speed change mechanism 5 is brought into the state that corresponds to each range and the transition completes, that is, the P-out control using the hydraulic pressure $P_{MOP}$ of the mechanical oil pump 21 while the internal combustion engine 2 is stopped is terminated, and the procedure returns (S21).

Note that configuration, operation, and effects other than the above are the same as the first embodiment. Therefore, the explanation is not given.

In the first and second embodiments described above, the one-motor parallel type hybrid drive device 1 is exemplified for explanation, and in the third embodiment, the automatic transmission 201 installed in a vehicle having an idle-stop function is exemplified for explanation. However, embodiments are not limited thereto. The present disclosure can be applied to vehicular power transmission devices such as split-type and series-type hybrid drive devices, and electrically powered drive devices in electric vehicles. Particularly, in case of series-type hybrid drive devices, the internal combustion engine does not directly generate driving force to drive the vehicle. However, it can be said that the internal combustion engine is a driving source to generate electric power energy and drive the vehicle.

In the present embodiments as mentioned above, it is exemplified that the line pressure PL is supplied as the release hydraulic pressure $P_{NOT}$. However, embodiments are not limited thereto. A secondary regulator valve may be provided and a secondary pressure that is regulated by the secondary regulator may be utilized. Any hydraulic pressure may be utilized as long as the hydraulic pressure is directly influenced by the hydraulic pressure $P_{MOP}$ of the mechanical oil pump 21 and the hydraulic pressure $P_{EOP}$ of the electrically powered oil pump 22.

INDUSTRIAL APPLICABILITY

The vehicular power transmission device according to the present disclosure may be utilized for automobiles, trucks, etc., particularly preferable to be utilized for the automobiles, trucks, etc. which include a first oil pump and a second oil pump whose capacity is smaller than the first oil pump and require improvement of fuel efficiency and down-sizing of the second oil pump.

The invention claimed is:

1. A vehicular power transmission device comprising:
   a parking gear that is drivingly coupled with wheels;
   a parking pawl that is capable of meshing or unmeshing with or from the parking gear;
   a hydraulic pressure actuator that unmeshes the parking pawl from the parking gear when a release hydraulic pressure is supplied;
   a first oil pump that generates a hydraulic pressure;
   a second oil pump that generates the hydraulic pressure, the second oil pump having a capacity smaller than the first oil pump;
   a hydraulic pressure control device that is capable of deriving the release hydraulic pressure from the hydraulic pressure generated by the second oil pump or the hydraulic pressure generated by the first oil pump and supplying the release hydraulic pressure to the hydraulic pressure actuator; and
   an electronic control unit that is programmed to, when a non-parking range is selected from a parking range through an operation on a shift selection part while the first oil pump is stopped,
   control the first pump so that it is not driven and control the hydraulic pressure control device such that the release hydraulic pressure derived from the hydraulic pressure generated by the second oil pump is supplied to the hydraulic pressure actuator, if the control unit determines that an inclination of a vehicle is less than a predetermined inclination angle, and cause the first oil pump to be driven and control the hydraulic pressure control device such that the release hydraulic pressure derived from the hydraulic pressure generated by the first oil pump is supplied to the hydraulic pressure actuator, if the control unit determines that the inclination of the vehicle is greater than the predetermined inclination angle.

2. The vehicular power transmission device according to claim 1, wherein the first oil pump is a mechanical oil pump that is driven by a driving source driving the vehicle and generates the hydraulic pressure, the second oil pump is an electrically powered oil pump that is driven by a rotary electric device that is different from the driving source and generates the hydraulic pressure, the control unit, when the non-parking range is selected from the parking range through the operation on the shift selection part while the driving source is stopped, controls the hydraulic pressure control device such that the release hydraulic pressure derived from the hydraulic pressure generated by the electrically powered oil pump is supplied to the hydraulic pressure actuator, if the control unit determines that the inclination of the vehicle is less than the predetermined inclination angle, and causes the driving source to be driven to cause the mechanical oil pump to be driven and controls the hydraulic pressure control device such that the release hydraulic pressure derived from the hydraulic pressure generated by the mechanical oil pump is supplied to the hydraulic pressure actuator, if the control unit determines that the inclination of the vehicle is greater than the predetermined inclination angle.

3. The vehicular power transmission device according to claim 2, further comprising:

a detector that is capable of detecting unmeshing between the parking pawl and the parking gear, wherein when the control unit determines that the inclination of the vehicle is greater than the predetermined inclination angle and causes the driving source to be driven to cause the mechanical oil pump to be driven, when the unmeshing between the parking pawl and the parking gear is detected, the control unit causes the driving source to be stopped.

4. The vehicular power transmission device according to claim 3, further comprising:

a friction engagement element that is provided on a power transmission path from the driving source to the wheels and capable of disconnecting power transmission between the driving source and the wheels, wherein when the non-parking range is selected from the parking range through the operation on the shift selection part while the driving source is stopped, in a case in which the control unit determines that the inclination of the vehicle is greater than the predetermined inclination angle, the control unit, with the power transmission path being disconnected by the friction engagement element, causes the driving source to be driven to cause the mechanical oil pump to be driven and controls such that the release hydraulic pressure derived from the hydraulic pressure generated by the mechanical oil pump is supplied to the hydraulic pressure actuator.

5. The vehicular power transmission device according to claim 4, wherein the friction engagement element is the friction engagement element that establishes the transmission path in the speed change mechanism, and when a travel range as the non-parking range is selected from the parking range through an operation on the shift selection part, the control unit causes the driving source to be stopped and thereafter causes the friction engagement element to be engaged.

6. The vehicular power transmission device according to claim 2, further comprising a friction engagement element that is provided on a power transmission path from the driving source to the wheels and capable of disconnecting power transmission between the driving source and the wheels, wherein when the non-parking range is selected from the parking range through the operation on the shift selection part while the driving source is stopped, in a case in which the control unit determines that the inclination of the vehicle is greater than the predetermined inclination angle, the control unit, with the power transmission path being disconnected by the friction engagement element, causes the driving source to be driven to cause the mechanical oil pump to be driven and controls such that the release hydraulic pressure derived from the hydraulic pressure generated by the mechanical oil pump is supplied to the hydraulic pressure actuator.

7. The vehicular power transmission device according to claim 6, wherein the friction engagement element is the friction engagement element that establishes the transmission path in a speed change mechanism, and when a travel range as the non-parking range is selected from the parking range through the operation on the shift selection part, the control unit causes the driving source to be stopped and thereafter causes the friction engagement element to be engaged.

8. The vehicular power transmission device according to claim 2, wherein in a case in which the control unit determines that the inclination of the vehicle is greater than the predetermined inclination angle, the control unit causes the driving source to be driven to cause the mechanical oil pump to be driven and causes the electrically powered oil pump to be driven.

9. The vehicular power transmission device according to claim 2, wherein the hydraulic pressure control device controls by a hydraulic pressure a friction engagement element that establishes a transmission path in a speed change mechanism, and the electrically powered oil pump supplies the hydraulic pressure to the hydraulic control device while the driving source is stopped.

* * * * *